United States Patent
Fang

(10) Patent No.: US 6,765,364 B2
(45) Date of Patent: Jul. 20, 2004

(54) RECHARGEABLE LITHIUM BATTERY PACKET

(75) Inventor: Jang-Chung Fang, Taipei (TW)

(73) Assignee: Pacific Energytech. Co., Ltd., Taipei (TW)

( * ) Notice: Subject to any disclaimer, the term of this patent is extended or adjusted under 35 U.S.C. 154(b) by 0 days.

(21) Appl. No.: 10/177,072

(22) Filed: Jun. 24, 2002

(65) Prior Publication Data

US 2003/0234632 A1 Dec. 25, 2003

(51) Int. Cl.⁷ .............................. H02J 7/00; F21V 33/00
(52) U.S. Cl. ..................... 320/110; 362/253; 362/183
(58) Field of Search ................................. 320/110, 112; 362/200, 119, 201, 116, 189, 196, 208; D26/38; 439/929

(56) References Cited

U.S. PATENT DOCUMENTS

| | | | |
|---|---|---|---|
| 5,279,314 A | * | 1/1994 | Poulos et al. ............... 132/322 |
| 5,432,689 A | * | 7/1995 | Sharrah et al. ............. 439/929 |
| 5,486,432 A | * | 1/1996 | Sharrah et al. .............. 429/99 |
| 5,534,788 A | * | 7/1996 | Smith et al. ................. 324/771 |
| RE37,092 E | * | 3/2001 | Sharrah et al. ............. 362/183 |
| 6,231,207 B1 | * | 5/2001 | Kennedy et al. ............ 362/158 |
| 6,331,763 B1 | * | 12/2001 | Thomas et al. ............. 320/136 |
| 6,536,917 B1 | * | 3/2003 | Aperocho et al. .......... 362/253 |
| 6,608,470 B1 | * | 8/2003 | Oglesbee et al. ........... 320/136 |

* cited by examiner

*Primary Examiner*—Pia Tibbits
(74) *Attorney, Agent, or Firm*—Birch, Stewart, Kolasch & Birch, LLP

(57) ABSTRACT

A rechargeable lithium battery packet includes a strengthened plastic casing accommodating a plurality of repeatedly usable lithium batteries therein and being provided with a protective circuit board, positive and negative terminals, and a charger receptacle. The case is also coated with a layer of insulating film to provide enhanced insulting effect. The rechargeable lithium battery packet has the advantages of light in weight, wet-proof, repeatedly rechargeable and dischargeable to provide prolonged usable life, increased supply voltage, large dischargeable current, and being environmentally friendly.

4 Claims, 5 Drawing Sheets

RECHARGEABLE LITHIUM BATTERY PACKET

FIELD OF THE INVENTION

The present invention relates to a rechargeable lithium battery packet, and more particularly to a battery packet having a strengthened plastic casing to enclose a plurality of lithium batteries therein. The rechargeable lithium battery packet is conveniently portable and loadable, and is suitable for use with a flashlight to supply energy needed for a bulb of the flashlight to emit light. The repeatedly usable lithium battery packet also reduces environmental pollution possibly caused by arbitrarily discarded batteries.

BACKGROUND OF THE INVENTION

A flashlight is a necessary electrical appliance for most families, stores, and business locations. It is particularly helpful in power failures caused by earthquake, hurricane, fire, flood, etc. to get rid of fear in the dark. A conventional flashlight is powered with alkaline or dry batteries to supply energy needed for a bulb of the flashlight to emit light. Alkaline or dry batteries have the following disadvantages: (a) exhausted alkaline or dry batteries are either discarded or recovered, and users have to buy new ones to replace the old ones that results in unnecessary waste of money; and (b) alkaline or dry batteries are heavy in weight that plus the weight of the flashlight forms an inconvenience to users.

There are rechargeable batteries and lead-acid rechargeable batteries developed to replace the alkaline and dry batteries. These types of batteries have the advantages of being rechargeable and dischargeable for repeated use. They are, however, bulky in volume and must be refilled with battery liquid after being used for a period of time. Due to the bulky volume and the weight almost several times as heavy as the alkaline/dry batteries, the lead-acid rechargeable batteries are usually used with wall-mount safety lighting fixtures, motorcycles, and automobiles as a power source, but not suitable for use with the hand-held flashlights.

Light and convenient nickel-cadmium batteries and nickel-hydrogen batteries are therefore developed to replace the conventional batteries for use with flashlights. The nickel-cadmium and nickel-hydrogen batteries have the advantages of light in weight, convenient for use, repeatedly rechargeable and dischargeable, and the disadvantage of causing heavy metal pollution. Moreover, the nickel-cadmium and nickel-hydrogen batteries have the so-called battery memory effect. Thus, it is necessary to discharge any unused power of these types of batteries before they can be recharged, in order to avoid a shortened usable life of the batteries.

A common drawback for the above-mentioned various kinds of batteries is that they all appear in individual form for use. When a user wants to load the flashlight, he or she must insert the batteries one by one. This is, of course, very inconvenient for the user to do so, particularly when the flashlight is to be used in an emergency. And, the flashlight would be completely useless in case of any shortage of the batteries. In a worst condition, the user might lose life because failing to quickly insert sufficient number of batteries into the flashlight. Another common problem with the batteries is that the battery liquid tends to leak due to humidity and heat after the batteries have been loaded in the flashlight for a prolonged time.

It is therefore tried by the inventor to develop an improved rechargeable lithium battery packet to eliminate the above-mentioned drawbacks existing in the conventional batteries for flashlights.

SUMMARY OF THE INVENTION

A primary object of the present invention is to provide a rechargeable lithium battery packet that encloses a plurality of lithium batteries in a strengthened plastic casing to provide a modularized battery packet. The modularized battery packet can be more conveniently inserted into a flashlight and is wet-proof.

Another object of the present invention is to provide a rechargeable lithium battery packet that includes rechargeable and dischargeable lithium batteries for repeated use to reduce environmental pollution possibly caused by discarded batteries, and does not have memory effect to enable immediately charge without the need of discharging any remained battery power.

A further object of the present invention is to provide a rechargeable lithium battery packet that has the advantages of light in weight, prolonged usable life, increased supply voltage, and large dischargeable current.

The rechargeable lithium battery packet of the present invention is characterized in a strengthened plastic casing accommodating a plurality of repeatedly usable lithium batteries therein, provided with an internal protective circuit board, positive and negative terminals, and a charger receptacle, and coated with a layer of insulating film.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
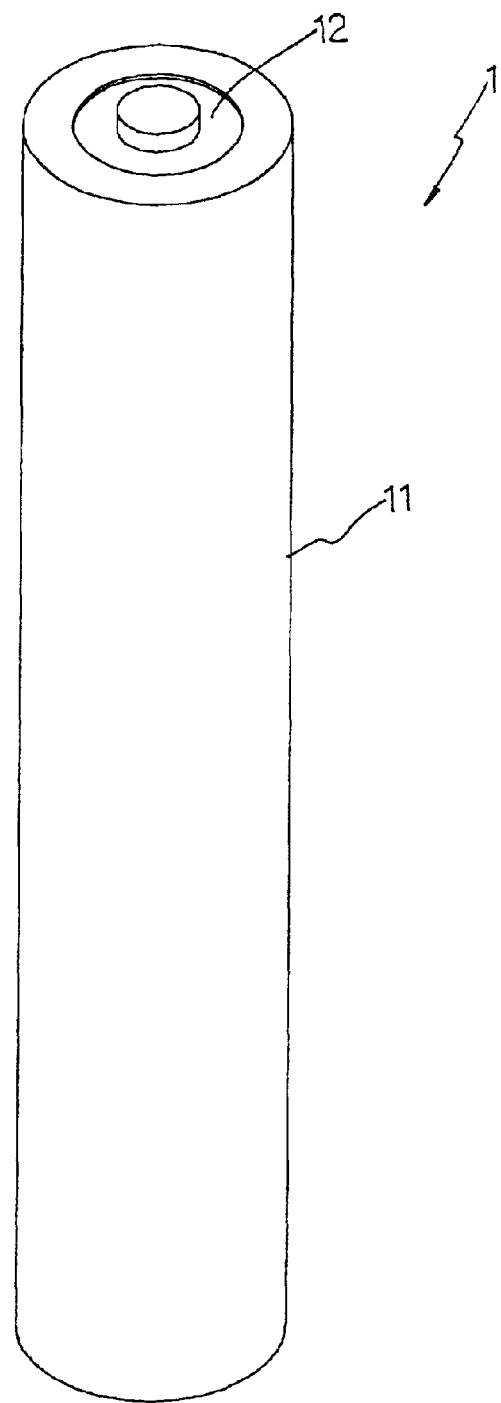
FIG. 1 is a perspective view of a rechargeable lithium battery packet according to the present invention.
Figure 2:
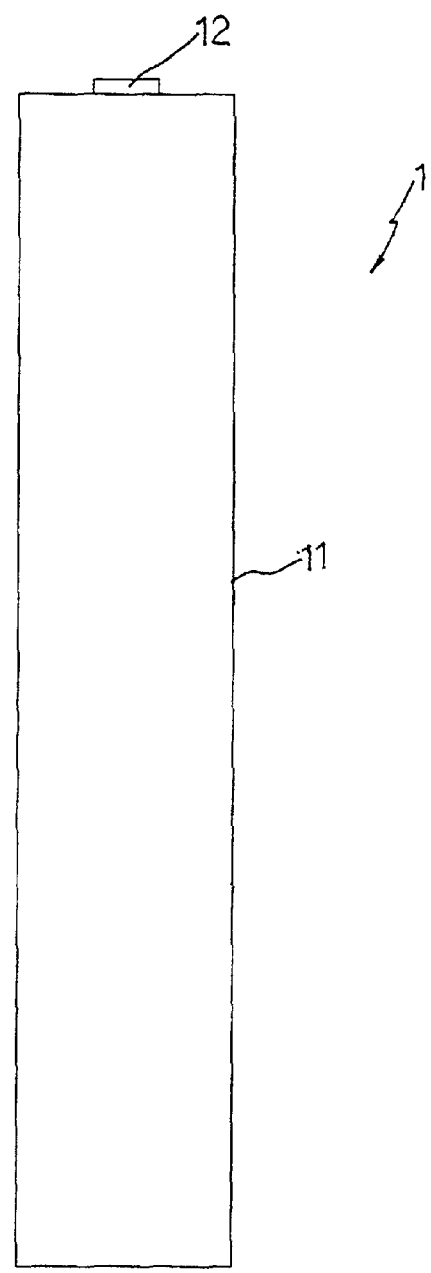
FIG. 2 is a plan view of FIG. 1.
Figure 3:
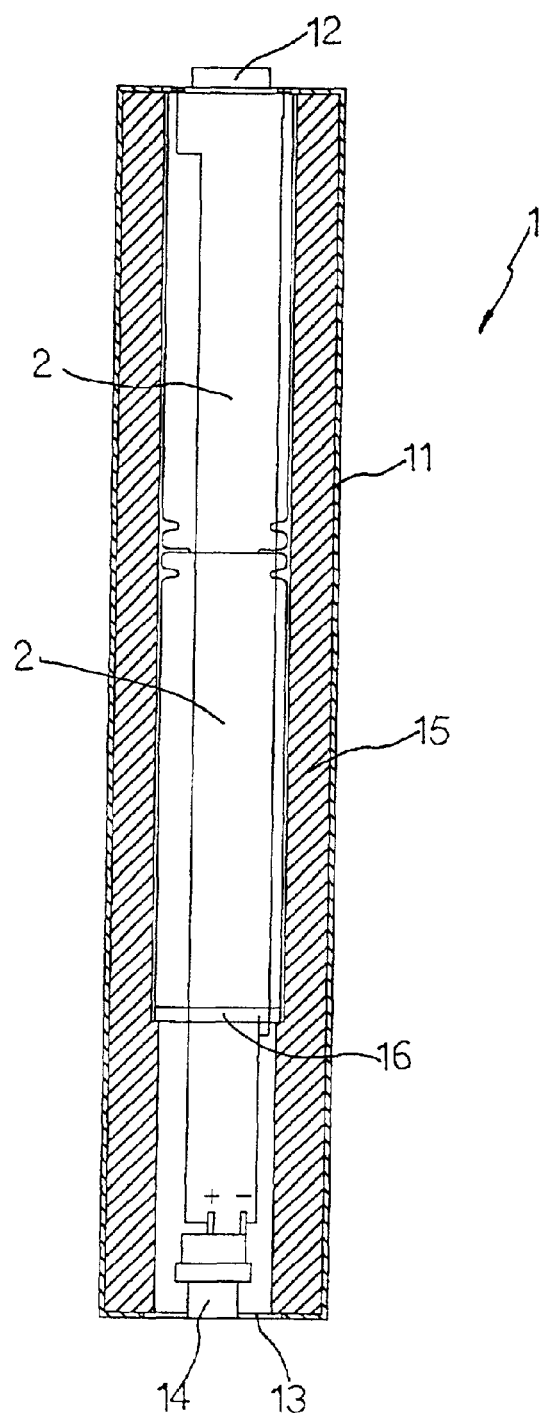
FIG. 3 is a sectional view of FIG. 1 showing an internal structure of the present invention.

Please refer to FIGS. 1, 2, and 3 that are perspective, plan, and sectional views, respectively, of a rechargeable lithium battery packet 1 according to the present invention particularly designed for use with a flashlight to supply power needed for the latter to produce light. As shown, the rechargeable lithium battery packet 1 is an elongate cylinder close to the shape of a commercially available No. 3 (Size AA) dry battery. The lithium battery packet 1 of the present invention is a modularized battery packet including a casing 15 coated with a layer of insulating film 11 to enclose a plurality of lithium batteries 2 therein. When a user wants to use a flashlight, he or she needs only to load the same with a lithium battery packet 1 matching with a voltage specified for the flashlight to supply power needed by the flashlight to emit light. The problems of inconveniently replacing and inserting the conventional batteries one by one into a flashlight in an emergency and finding insufficient number of batteries during loading the flashlight can therefore be avoided.

Figure 4:
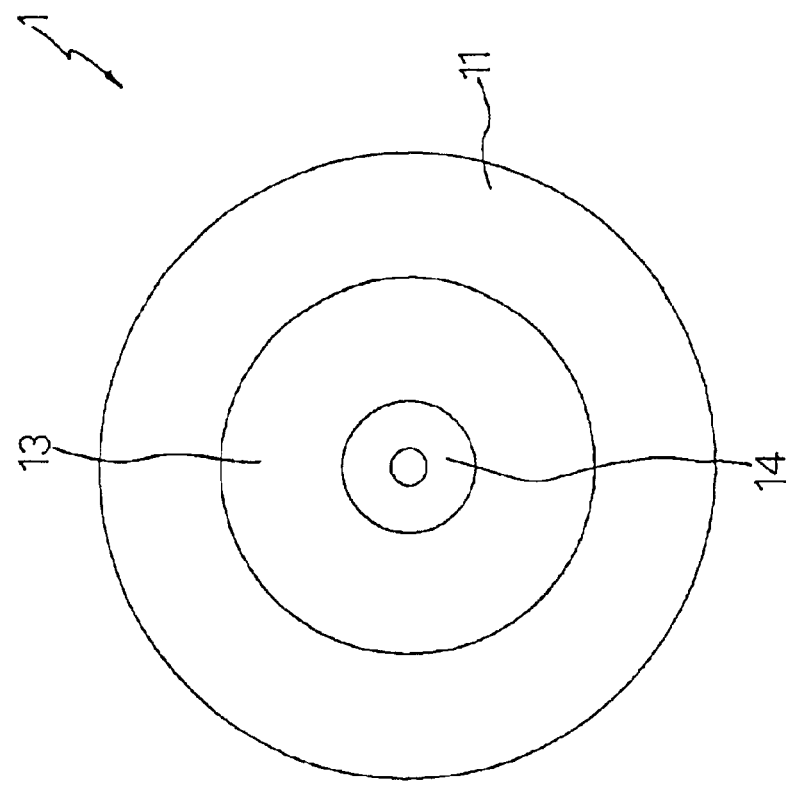
FIG. 4 is a bottom plan view of the present invention.

As can be clearly seen in FIG. 3, the lithium battery packet 1 of the present invention mainly includes a strengthened hollow plastic casing 15 that is in the form of a cylinder and made of a strengthened engineering plastic material selected from the group consisting of PP, PE, ABS, and PVC. The casing 15 has a stepped inner wall surface to define a diameter-expanded upper space and a diameter-reduced lower space. The diameter-expanded upper space is adapted to accommodate two or more lithium batteries 2 therein. A topmost one of the lithium batteries 2 set in the casing 15 is provided at an upper end with a positive terminal 12 that is exposed from a top of the battery packet 1. A protective circuit board 16 is provided at a lower end of the diameter-expanded upper space to electrically contact with a bottommost one of the lithium batteries 2 set in the casing 15, and a charger receptacle 14 is provided in the diameter-reduced space to electrically connect to the protective circuit board 16. A negative terminal 13 is tightly fitted to a bottom of the charger receptacle 14 to conduct current produced by the lithium batteries 2. FIG. 4 is a bottom plan view of the rechargeable lithium battery packet 1 of the present invention.

To enable the casing 15 to best insulate the enclosed lithium batteries 2 from external environments, a whole outer surface of the casing 15, except areas at where the positive and the negative terminal 12, 13 are located for conducting current, is coated with a layer of insulating film 11 to complete the lithium battery packet 1. The lithium battery packet 1 with the above-described structure can be repeatedly recharged and discharged for repeated use. Moreover, the lithium battery packet 1 does not have any memory effect and can be recharged whenever the lithium batteries 2 are found in low battery supply. It is not necessary to discharge any remaining battery supply before the lithium battery packet 1 could be recharged. The use of the rechargeable battery packet 1 is therefore environmentally friendly to reduce environmental pollution possibly caused by discarded batteries.

The rechargeable lithium battery packet 1 of the present invention has also the advantages of light in weight, prolonged usable life, increased supply voltage, and large dischargeable current.

Figure 5:
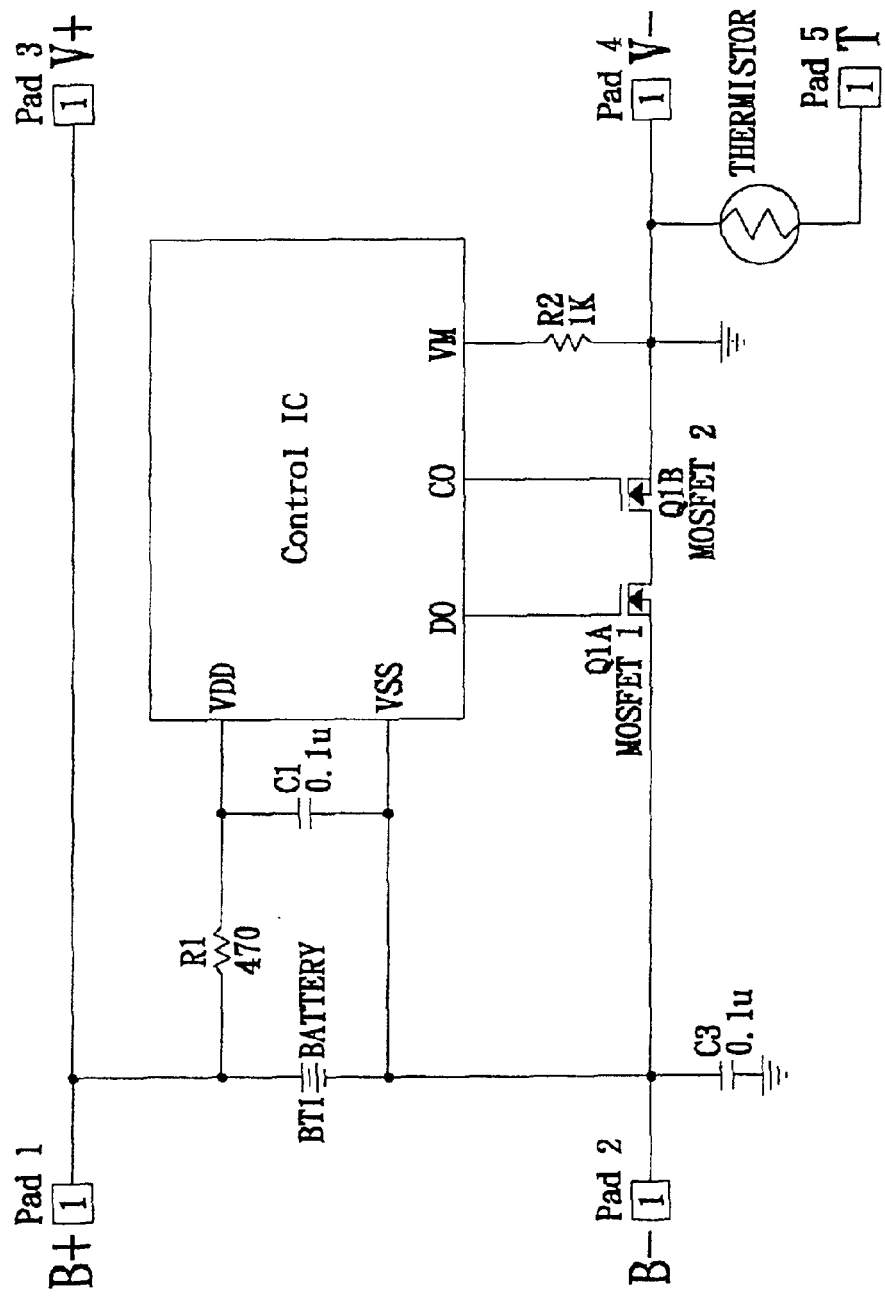
FIG. 5 is a circuit diagram of a protective circuit board included in the present invention.

Please refer to FIG. 5 that shows a circuit diagram of the protective circuit board 16 of the lithium battery packet 1. As shown, the circuit structure includes overvoltage/overcurrent protective circuits to avoid overloaded voltage/current during recharging or discharging the lithium batteries 2 via the charger receptacle 14, and to avoid damaged lithium batteries 2 resulted from overloaded voltage/current while using the lithium batteries 2 with a flashlight. Since the circuit structure is an overvoltage/overcurrent protective circuit known in the art, it is not discussed in details herein.

The present invention has been described with a preferred embodiment thereof and it is understood that many changes and modifications in the described embodiment can be carried out without departing from the scope and the spirit of the invention as defined by the appended claims.

What is claimed is:

1. A rechargeable lithium battery packet, comprising a plurality of lithium batteries enclosed in a casing to form a modular unit for loading in a flashlight to provide energy needed by said flashlight to emit light; said casing being a strengthened hollow plastic casing in the shape of a cylinder and having a stepped inner wall surface to define a diameter-expanded upper space and a diameter-reduced lower space therein; said plurality of lithium batteries being enclosed in said diameter-expanded upper space of said casing; a topmost one of said plurality of lithium batteries set in said casing being provided at an upper end with a positive terminal that is exposed from a top of said battery packet; a protective circuit board being provided at a lower end of said diameter-expanded upper space to electrically contact with a lower end of a bottommost one of said plurality of lithium batteries set in said casing; a battery charger connection receptacle being provided in said diameter-reduced lower space to electrically connect to said protective circuit board; and a negative terminal being tightly fitted to a bottom of said battery charger connection receptacle for conducting current to said lithium batteries.

2. The rechargeable lithium battery packet as claimed in claim 1, wherein said casing is provided at entire outer surface, except areas at where said positive and said negative terminal are located to conduct current, with a layer of insulating film.

3. The rechargeable lithium battery packet as claimed in claim 1, wherein said protective circuit board has a circuit structure including overvoltage and overcurrent protective circuits.

4. The rechargeable lithium battery packet as claimed in claim 1, wherein said casing is made of a strengthened engineering plastic material selected from the group consisting of PP, PE, ABS, and PVC.

* * * * *